US008556181B2

(12) United States Patent
Twiste

(10) Patent No.: US 8,556,181 B2
(45) **Date of Patent: *Oct. 15, 2013**

(54) DEVICE FOR REGISTERING GOODS

(75) Inventor: Josef Twiste, Paderborn (DE)

(73) Assignee: Wincor Nixdorf International GmbH (DE)

( * ) Notice: Subject to any disclaimer, the term of this patent is extended or adjusted under 35 U.S.C. 154(b) by 96 days.

This patent is subject to a terminal disclaimer.

(21) Appl. No.: 13/256,352

(22) PCT Filed: Mar. 4, 2010

(86) PCT No.: PCT/EP2010/001339
§ 371 (c)(1),
(2), (4) Date: Sep. 13, 2011

(87) PCT Pub. No.: WO2010/105741
PCT Pub. Date: Sep. 23, 2010

(65) Prior Publication Data

US 2012/0018520 A1 Jan. 26, 2012

(30) Foreign Application Priority Data

Mar. 18, 2009 (DE) ......................... 10 2009 013 635

(51) Int. Cl.

| | |
|---|---|
| ***G06K 7/10*** | (2006.01) |
| ***G06K 15/00*** | (2006.01) |
| ***G06F 17/00*** | (2006.01) |
| ***G06F 19/00*** | (2011.01) |
| ***G06Q 30/00*** | (2012.01) |
| ***G06Q 90/00*** | (2006.01) |

(52) U.S. Cl.
USPC ...... 235/470; 235/462.01; 235/375; 235/385; 235/378

(58) Field of Classification Search
USPC ............. 235/462.01, 379–381, 375, 385, 470
See application file for complete search history.

(56) References Cited

U.S. PATENT DOCUMENTS

| | | | | |
|---|---|---|---|---|
| 285,664 | A * | 9/1883 | Pearce | .......................... 198/728 |
| 2,679,852 | A | 6/1954 | Erie | |

(Continued)

FOREIGN PATENT DOCUMENTS

| | | | |
|---|---|---|---|
| CA | 2466187 | A1 | 11/2005 |
| DE | 1295475 | B | 5/1969 |

(Continued)

OTHER PUBLICATIONS

International Search Report (in English and German) and Written Opinion of the International Searching Authority (in German) for PCT/EP2010/001339, mailed May 17, 2010; ISA/EP.

*Primary Examiner* — Daniel Walsh
(74) *Attorney, Agent, or Firm* — Harness, Dickey & Pierce, P.L.C.

(57) ABSTRACT

A device for registering goods in a self-service cash register system is proposed, comprising a conveying device (2) for conveying goods in a predefined conveying direction (3), with at least one conveying means (4, 5, 10) of the conveying device onto which the goods can be placed for conveying, with at least one scanning device (1) arranged in a locally fixed manner at the conveying device (2) for registering machine-readable codes with which the goods are equipped, with at least one source for emitting optical radiation in the direction of the conveying device and at least one detector for receiving the radiation reflected by the goods lying on the conveying device and for generating a signal that corresponds to the intensity of the reflected radiation, wherein the conveying means (10) is pervious to the optical radiation from the source at least in some sections.

7 Claims, 1 Drawing Sheet

(56) References Cited

U.S. PATENT DOCUMENTS

| | | | | |
|---|---|---|---|---|
| 2,883,036 | A | 4/1959 | Fox | |
| 3,206,001 | A | 9/1965 | Peppier | |
| 3,587,856 | A * | 6/1971 | Lemelson | 209/3.3 |
| 3,622,758 | A | 11/1971 | Schanne | |
| 3,734,286 | A | 5/1973 | Simjian | |
| 3,774,014 | A * | 11/1973 | Berler | 235/462.11 |
| 3,792,234 | A * | 2/1974 | Sturzenegger | 235/483 |
| 3,854,571 | A | 12/1974 | Siirtola | |
| 3,928,759 | A * | 12/1975 | Sansone | 250/568 |
| 3,930,088 | A * | 12/1975 | Constantin et al. | 428/143 |
| 3,949,194 | A * | 4/1976 | Catto et al. | 235/475 |
| 3,960,640 | A | 6/1976 | Mort, Jr. et al. | |
| 4,009,369 | A | 2/1977 | Hayosh et al. | |
| 4,079,240 | A * | 3/1978 | Rynkowski | 235/462.28 |
| 4,236,604 | A | 12/1980 | Warner | |
| 4,443,995 | A * | 4/1984 | Myers et al. | 53/443 |
| 4,912,554 | A | 3/1990 | Neri | |
| 4,939,355 | A * | 7/1990 | Rando et al. | 235/462.14 |
| 4,941,562 | A | 7/1990 | Proepper et al. | |
| 5,007,525 | A | 4/1991 | Crawshay | |
| 5,012,916 | A | 5/1991 | Cruver | |
| 5,025,477 | A | 6/1991 | Baitz et al. | |
| 5,035,315 | A | 7/1991 | Fukusaki et al. | |
| 5,118,929 | A * | 6/1992 | Scata | 235/462.14 |
| 5,147,027 | A | 9/1992 | Cruver | |
| 5,256,864 | A * | 10/1993 | Rando et al. | 235/462.14 |
| 5,491,328 | A * | 2/1996 | Rando | 235/462.14 |
| 5,501,316 | A | 3/1996 | Hermening et al. | |
| 5,501,318 | A | 3/1996 | Disrud | |
| 5,525,786 | A * | 6/1996 | Dumont | 235/462.14 |
| 5,551,531 | A | 9/1996 | Dumont | |
| 5,667,055 | A | 9/1997 | Gambetti | |
| 5,894,939 | A * | 4/1999 | Frankel | 209/630 |
| 6,431,450 | B1 * | 8/2002 | Lundahl et al. | 235/462.43 |
| 6,446,870 | B1 * | 9/2002 | Rando | 235/462.43 |
| 6,557,693 | B1 | 5/2003 | Freudelsperger | |
| 6,971,503 | B2 * | 12/2005 | Thompson | 198/494 |
| 6,978,878 | B2 | 12/2005 | Chiu | |
| 7,006,665 | B2 * | 2/2006 | Olson et al. | 382/101 |
| 7,481,309 | B2 | 1/2009 | Wagner et al. | |
| 8,074,785 | B2 * | 12/2011 | Twiste | 198/620 |
| 2003/0079963 | A1 | 5/2003 | Zimmermann | |
| 2004/0178049 | A1 * | 9/2004 | Hertz et al. | 198/690.2 |
| 2005/0109580 | A1 * | 5/2005 | Thompson | 198/495 |
| 2006/0038009 | A1 * | 2/2006 | Russell et al. | 235/383 |
| 2008/0056787 | A1 * | 3/2008 | Boness et al. | 399/364 |
| 2008/0110724 | A1 * | 5/2008 | Twiste | 198/620 |
| 2010/0140357 | A1 * | 6/2010 | Roslak et al. | 235/462.43 |
| 2011/0320036 | A1 * | 12/2011 | Freudelsperger | 700/226 |
| 2012/0004763 | A1 * | 1/2012 | Freudelsperger | 700/224 |
| 2012/0138687 | A1 * | 6/2012 | Baitz | 235/470 |
| 2012/0187191 | A1 * | 7/2012 | Olmstead | 235/462.13 |
| 2012/0187195 | A1 * | 7/2012 | Actis et al. | 235/479 |
| 2012/0247924 | A1 * | 10/2012 | Baitz et al. | 198/606 |

FOREIGN PATENT DOCUMENTS

| | | | |
|---|---|---|---|
| DE | 2002150 | A1 | 9/1970 |
| DE | 2006575 | A1 | 6/1979 |
| DE | 3715570 | A1 | 12/1988 |
| DE | 3915217 | A1 | 7/1990 |
| DE | 4235369 | C1 | 3/1994 |
| DE | 19542647 | C2 | 3/1998 |
| DE | 10141429 | C1 | 1/2003 |
| DE | 10152327 | A1 | 5/2003 |
| DE | 69529658 | T2 | 7/2003 |
| DE | 10347540 | A1 | 5/2005 |
| DE | 102006054115 | A1 | 3/2008 |
| DE | 102007053290 | A1 | 5/2009 |
| EP | 0 338 376 | A2 | 10/1989 |
| EP | 0644504 | A1 | 3/1995 |
| GB | 1266219 | A | 3/1972 |
| JP | 05126535 | A * | 5/1993 |

* cited by examiner

DEVICE FOR REGISTERING GOODS

CROSS-REFERENCE TO RELATED APPLICATIONS

This application is a National Stage of International Application No. PCT/EP2010/001339, filed Mar. 4, 2010, and published in German as WO 2010/105741 A1 on Sep. 23, 2010. This application claims priority to German application No. 10 2009 013 635.5, filed Mar. 18, 2008. The entire disclosures of the above applications are incorporated herein by reference.

BACKGROUND

This section provides background information related to the present disclosure which is not necessarily prior art.

1. Technical Field

The invention relates to a device for registering goods at a self-service cash register system.

2. Discussion

Devices of this kind are used to register goods selected by a customer in a self-service department store. Registration is designed to proceed automatically in order to dispense with the presence of a cashier when the goods are paid for. The process by which the customer registers and pays for the goods he/she has selected without requiring the presence of a cashier is known as self-checkout. The goods are registered with or without the assistance of the customer, and the sales price for the goods registered is calculated. The customer then pays for his/her purchase in cash or with a card directly at the self-service cash register system. The goods are furnished with a machine-readable label or a machine-readable code. The label or the code is, for example, a one-dimensional, two-dimensional or other multi-dimensional bar code. The machine-readable label includes the price of the goods. The customer places the goods he/she has selected on a conveying device, for example a conveyor belt. One or more stationary scanning devices are located at the conveying device to register the label on the goods. The scanning device consists of several scanning units. Each scanning unit is furnished with a source for emitting optical radiation and with a detector for receiving the radiation reflected by the goods lying on the conveying device. The optical radiation is typically light in the visible spectrum or in the infrared spectrum. By means of a reflected pattern, the scanning unit generates a scanning pattern that is reproduced on the goods, registered and reflected by the goods. The scanning unit further generates a signal corresponding to the reflected radiation. Scanning units of this type are known as bar code readers or scanners. They are frequently known as laser scanner modules. They convert the optically scanned, machine-readable label into electrical signals that are entered in digital form as input variables into a data processing unit of a self-service cash register system.

Devices for registering goods at a self-service cash register system are customarily furnished with scanning devices using several scanning units that are arranged at different positions at and above the conveying device. Such devices are also described as tunnel scanners. In this case, the individual scanning units are arranged in a locally fixed manner along a gateway extending above the conveying direction. The goods lying on the conveying device are conveyed past the scanning units. As the goods pass said units, the scanning units register the surfaces of the goods from different directions.

Since most goods are furnished with a label at only one location, and a probability exists that cannot be ignored for the customer to place the goods on the conveyor belt with the side showing the label facing down, scanning from below is necessary in addition to scanning the goods from above and from the side to register the goods reliably. A device for registering goods at a self-service cash register system is known from DE 102006054115 A1 that is furnished with a conveyor belt and drivers running perpendicular to the conveyor belt for this purpose. The drivers are moved in the conveying direction above the conveyor belt and a scanning device. They pull or push the goods over the scanning device.

SUMMARY OF THE INVENTION

An object of the invention is to provide a device for registering goods at a self-service cash register system that offers additional possibilities, in addition to the known drivers, for guiding the goods over a scanning device so that a machine-readable label located on the underside of the item can be registered.

The device is distinguished by the fact that the conveying device is furnished with at least one conveying means onto which the goods are placed to be conveyed and that at least in some sections is pervious to optical radiation from the source of the scanning device. In contrast to the drivers known from the prior art, the purpose of the conveying means is not to push the goods over the scanning device, but rather to form a support for the goods to be conveyed. The goods can be placed in any position or in a predefined arrangement on the conveying means.

In order to be pervious to the radiation from the source of the scanning device, the conveying means can either have openings or recesses or consist, at least in some sections, of a material that possesses high transmission for the radiation. The openings or recesses can form a pattern. The areas of the conveying means that are pervious to the radiation can alternate with areas that absorb or reflect the radiation.

The conveying means that is pervious to the radiation can ensure conveyance of the goods in conjunction with additional conveying means. Furthermore, the conveying means can be the sole conveying means for the conveying direction and thus provide the only conveyance for the goods.

In accordance with an advantageous embodiment of the invention, the conveying means are furnished with at least one conveyor belt that has several openings. The openings can be configured to be round or square. They can all be the same size or be of different sizes. To ensure that the code for an item is registered through one or more openings, either the opening must be larger than the length of the code or several small openings must be provided whose individual size can be smaller than the size of the marking. In this case, the openings collectively form a larger part of the carrying side of the conveyor belt than the other areas. The openings can, for example, be part of a network or a grid-like configuration of the conveyor belt.

In accordance with a further advantageous embodiment of the invention, the conveying means has at least one conveyor belt that consists at least in some parts of a material pervious to the radiation from the source. In the relevant areas, the material for the conveyor belt has a high transmission ratio for the radiation. It must be ensured that the material of the conveyor belt does not scatter the radiation, or to only a very minor degree, so that the code can be read by the detector of the scanning device.

In accordance with a further advantageous embodiment of the invention, the conveying device has a first conveyor belt as conveying means and a second conveyor belt. The first conveyor belt is arranged at least ahead of the scanning device in the conveying direction. The second conveyor belt is at least in some sections pervious to the optical radiation from the source. The second conveyor belt is arranged at least in some sections above the scanning device and above the first conveyor belt. Thus, conveyance of the goods is not performed solely by the conveyor belt pervious to the radiation. Conveyance is performed by at least two conveyor belts. Thus, the conveyor belt pervious to the radiation does not have to possess the tractive force and strength necessary for the conveyance of the goods over its entire length but only over a distance corresponding to the extent of the scanning device in the conveyance direction. Both conveyor belts preferably circulate on rollers.

In accordance with a further advantageous embodiment of the invention, the first conveyor in the conveyance direction is arranged to circulate around rollers before and after the scanning device. For this purpose, the first conveyor belt is guided below the scanning device, for example. This prevents the first conveyor belt from covering the scanning device. Only the second conveyor belt is taken above the scanning device. Thus, in conjunction with the second conveyor belt, the first conveyor belt ensures that the goods are brought to the scanning device and continue to be conveyed after passing the scanning device. The second conveyor ensures conveyance over the scanning device.

In accordance with a further advantageous embodiment of the invention, the conveying device has a third conveyor belt as conveying means that is arranged in the conveying direction after the scanning device. In said arrangement, the second conveyor belt is arranged at least partially above the third conveyor belt. The third conveyor belt can similarly circulate on rollers. It is used to convey the goods further after passing the scanning device.

In accordance with a further advantageous embodiment of the invention, the conveying device is a roller conveyor having several rollers as the conveying means. The source and the detector for the scanning device is arranged between two of the rollers. The distance between the rollers is shorter than the predefined size of the smallest item that is registered by the scanning device. So that the movement of the rollers is not compromised by the scanning device and so that sufficient space is available for installation, operation and maintenance of the scanning device, the source and the detector for the scanning device is preferably arranged below the rollers.

BRIEF DESCRIPTION OF THE DRAWINGS

One embodiment of a device in accordance with the invention is shown in the drawing.

The drawings described herein are for illustrative purposes only of selected embodiments and not all possible implementations, and are not intended to limit the scope of the present disclosure.

Corresponding reference numerals indicate corresponding parts throughout the several views of the drawings.

DETAILED DESCRIPTION OF THE PREFERRED EMBODIMENTS

Example embodiments will now be described more fully with reference to the accompanying drawings.

Figure 1:
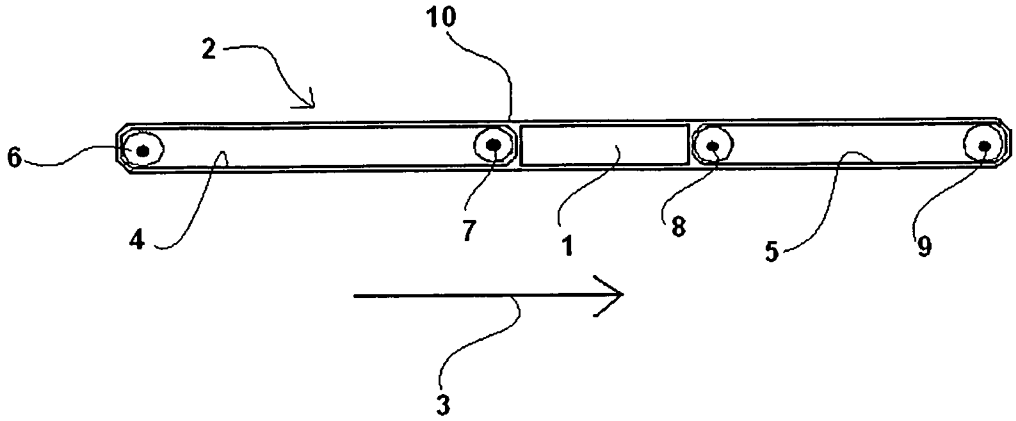
FIG. 1 shows a device for registering goods at a self-service cash register system in a side view.
Figure 2:
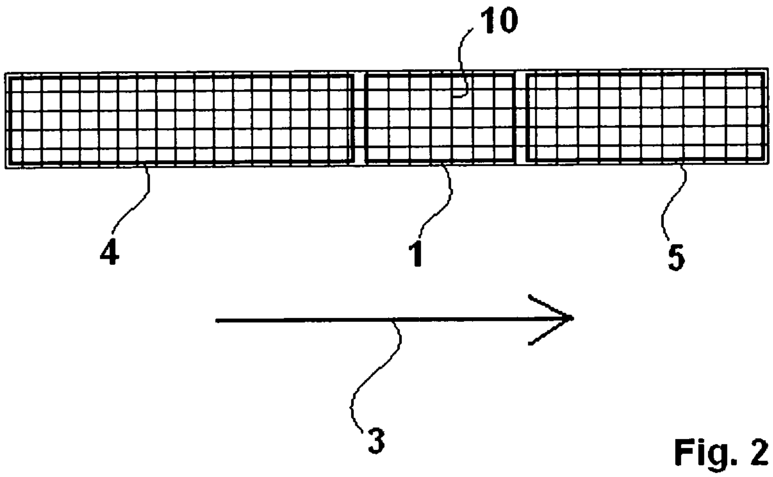
FIG. 2 shows a device from FIG. 1 in a plan view.

FIGS. 1 and 2 show a device for registering goods at a self-service cash register system having a scanning device 1 and a conveying device 2 that conveys goods in the conveying direction. The goods are not shown in the drawing. The conveying device has a first conveyor belt 4 and a third conveyor belt 5. The two conveyor belts 4 and 5 circulate on rollers 6, 7, 8 and 9. The first conveyor belt 4 is arranged with its rollers 6 and 7 ahead of the scanning device 1 in the conveying direction. The second conveyor belt 5 is arranged with its rollers 8 and 9 after the scanning device 1. A third conveyor belt, having a network or grid structure, is arranged circulating around the two rollers 6 and 9 and overlapping the first conveyor belt 4, the scanning device 1 and the second conveyor belt 5. It guides the goods arriving from the left across the scanning device.

All the features of the invention may be essential to the invention, both individually and in any combination with each other.

The foregoing description of the embodiments has been provided for purposes of illustration and description. It is not intended to be exhaustive or to limit the invention. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the invention, and all such modifications are intended to be included within the scope of the invention.

What is claimed:

1. A device for registering goods at a self-service cash register system comprising:

a conveying device configured to convey goods in a predefined conveying direction, the conveying device including a first conveyor belt and a third conveyor belt each having a support surface, a second conveyor belt at least partially arranged over the support surface of the first and third conveyor belts, the second conveyor belt configured to support goods seated thereon for conveying the goods in the conveying direction, the second conveyor belt surrounds both the first and the third belts; and at least one scanning device locally fixed at the conveying device configured to register machine-readable codes furnished for the goods and affixed thereto, the scanning device arranged after the first belt and before the third belt in the conveying direction, and including at least one source for emitting optical radiation towards the conveying device, and at least one detector for both receiving the radiation reflected from the goods lying on the conveying device and generating a signal matching the intensity of the reflected radiation;

wherein the second conveyor belt is a net with openings extending in directions orthogonal to each other with individual opening sizes smaller than the machine-readable codes and is configured to permit the passage of optical radiation therethrough from the source;

wherein the first and the third conveyor belts are configured to circulate around rollers to guide the second belt around the scanning device;

wherein the first, second, and third conveyor belts are configured to move at identical speeds and are in a common plane extending in the conveying direction; and wherein the device is operable to register the goods by reading the machine-readable codes affixed to the goods by the scanning device through the net as the goods are conveyed in the conveying direction.

2. The device according to claim 1, wherein the second belt has a grid-like structure.

3. The device according to claim 1, wherein the first belt and the third belt are each roller conveyors and each include a plurality of conveying rollers, the optical radiation source is between the first conveyor and the third conveyor.

4. The device according to claim 3, wherein the optical radiation source and the detector of the scanning unit are arranged between and below two of the rollers.

5. A device for registering goods at a self-service cash register comprising:

a first conveyor belt;

a second conveyor belt extending around the first conveyor belt, the second conveyor belt configured to support goods seated thereon for conveying the goods in a predetermined conveying direction;

a third conveyor belt; and a scanning device arranged between the first conveyor belt and the third conveyor belt in the conveying direction, the scanning device including an optical radiation source and a detector, the optical radiation source configured to emit optical radiation towards the second conveyor belt, the detector configured to receive optical radiation reflected from machine-readable codes affixed to goods lying on the second conveyor belt and to generate a signal matching an intensity of the reflected optical radiation;

wherein the second conveyor belt surrounds the first conveyor belt, the third conveyor belt, and the scanning device, and is a net with openings extending in directions orthogonal to each other with individual opening sizes smaller than the machine-readable codes, and is at least partially pervious to optical radiation from the optical radiation source;

wherein the first conveyor belt, the second conveyor belt, and the third conveyor belt are configured to move at the same speed and are in a common plane extending in the conveying direction; and wherein the device is operable to register the goods by reading the machine-readable codes affixed to the goods by the scanning device through the net as the goods are conveyed in the conveying direction.

6. The device of claim 5, wherein the second conveyor belt includes a plurality of openings configured to permit passage of optical radiation emitted by the optical radiation source.

7. A device for registering goods at a self-service cash register comprising:

a first conveyor belt;

a second conveyor belt;

a third conveyor belt configured to support goods seated thereon and convey the goods in a predetermined conveying direction;

a plurality of rollers configured to move the first, second, and third conveyor belts:

a scanning device between the first conveyor belt and the second conveyor belt, the scanning device including an optical radiation source and a detector, the optical radiation source configured to emit optical radiation towards and through the third conveyor belt, the detector configured to receive radiation reflected from goods having machine-readable codes affixed thereto lying on the third conveyor belt, and to generate a signal matching an intensity of the reflected radiation;

wherein the first conveyor belt, the second conveyor belt, the third conveyor belt, the plurality of rollers, and the scanning device are arranged generally along a common plane extending in the conveying direction;

wherein the third conveyor belt surrounds the first conveyor belt and the second conveyor belt, and overlaps the scanning device;

wherein the third conveyor belt is a net with openings extending in directions orthogonal to each other with individual opening sizes smaller than the machine-readable codes and is at least partially pervious to optical radiation from the optical radiation source;

wherein the first conveyor belt, the second conveyor belt, and the third conveyor belt are configured to move at the same speed; and wherein the device is operable to register the goods by reading the machine-readable codes affixed to the goods by the scanning device through the net as the goods are conveyed in the conveying direction.

* * * * *